Feb. 1, 1949.  B. B. SIMCOX  2,460,604
VENTILATOR
Filed Aug. 9, 1944   3 Sheets-Sheet 1

Inventor:
Burton B. Simcox
By
Attorney

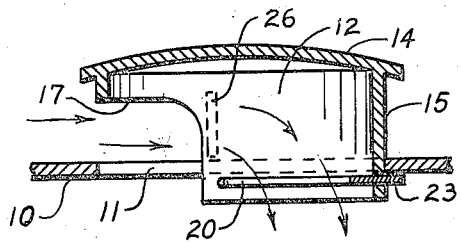
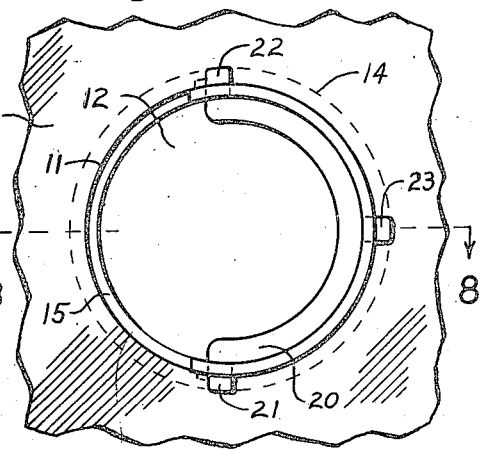
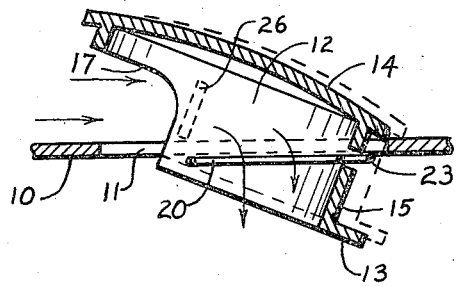
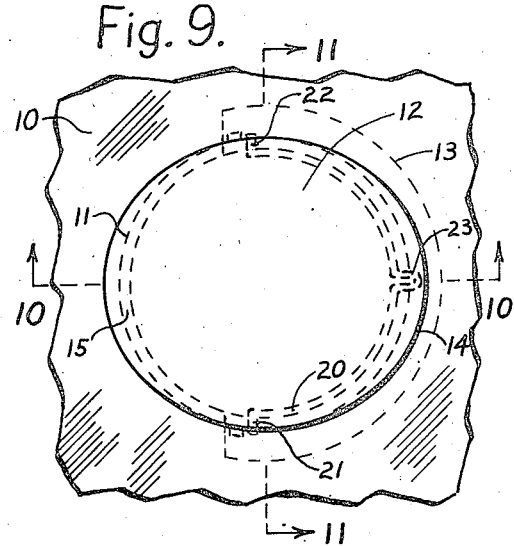
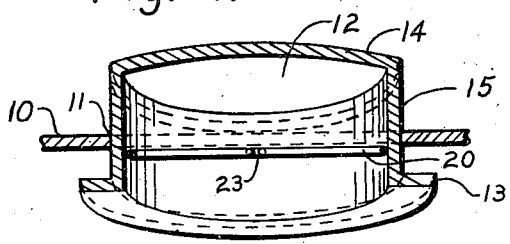

Feb. 1, 1949.  B. B. SIMCOX  2,460,604
VENTILATOR
Filed Aug. 9, 1944  3 Sheets-Sheet 3

Burton B. Simcox
Inventor

By  Attorney

Patented Feb. 1, 1949

2,460,604

UNITED STATES PATENT OFFICE 2,460,604

VENTILATOR

Burton B. Simcox, Knoxville, Tenn.

Application August 9, 1944, Serial No. 548,649

4 Claims. (Cl. 98—13)

This invention relates to a ventilator device for vehicles and more especially to a ventilator device adapted to be placed in the hull or side walls or window closures of an airplane or other vehicle for scooping air from the exterior of the vehicle and forcing it to the interior thereof, and comprises a cup-shaped member adapted to fit inside an opening in the vehicle with the front portion of the cup-shaped member being cut away so as to serve as a scoop for scooping air due to the forward motion of the vehicle and forcing it to the inside of the vehicle, and which is retractable to cause its outer surface to lie almost flush with the exterior surface of the vehicle when not in use.

It is an object of this invention to provide a ventilator device for vehicles comprising a resilient cup-shaped member adapted to be slightly compressed and to fit into an opening in the walls of the vehicle and said cup-shaped member being so formed that it can be moved outwardly bodily or swung outwardly as to its front end to expose the open front side of the cup-shaped member to the air through which the vehicle is passing to force air from the outside of the vehicle to the interior thereof.

It is another object of this invention to provide a ventilator adapted to fit into an opening in the wall of a vehicle and said ventilator comprising a cup-shaped member having a rim adapted to fit on the interior of the vehicle and being adapted to be compressed to permit its insertion into an opening in the wall of the vehicle and being so arranged as to not easily be removable except by manual operation, that is, so that the slip stream cannot tear the ventilator from the opening in which it is disposed, said cup-shaped member being retractable to close the opening in which it is mounted to thus decrease the drag effected by the member when in extended position.

It is another object of this invention to provide a ventilator device comprising an air scoop adapted to be fitted into an opening in the wall of a vehicle and having means whereby it can be telescoped into the inside of the vehicle where its exterior surface will lie substantially flush with the exterior surface of the wall of the vehicle, and being extendable so as to serve as a scoop to scoop air while the vehicle is in motion and to force the air to the interior of the vehicle.

It is another object of this invention to provide a ventilator of scoop-shape which can be rotatably and frictionally mounted in an opening in the wall or windows of a vehicle, which when facing forwardly will force from the exterior to the interior of the vehicle, and when facing rearwardly will draw air out of the interior of the vehicle.

Some of the objects of the invention having been stated, other objects will appear as the description proceeds, when taken in connection with the accompanying drawings, in which—

Figure 7 is an elevation looking from the inside of the vehicle of a modified ventilator which is retained in the vehicle opening by the projection of the expander ring;

Figure 8 is a cross-section through the ventilator of Figure 7 taken along the line 8—8 of Figure 7, and showing the ventilator in an open position;

Figure 9 is an elevation from the outside of the vehicle of a modified ventilator in closed position which permits its installation or removal from the inside of the vehicle;

Figure 10 is a cross-section through the ventilator of Figure 9 taken along the line 10—10 in Figure 9, and showing the ventilator in the open position;

Figure 11 is a cross-section through the ventilator of Figure 9 taken along the line 11—11 in Figure 9, and showing the ventilator in the open position;

Referring more specifically to the drawings, the numeral 10 indicates the wall of a vehicle which in the present instance may be the transparent Cellophane or other resin pane of a window frame or windshield of an airplane, or it can be the sheet metal portion of the airplane in which the ventilator can be mounted. In the portion 10, there is provided a circular opening 11 into which the cup-shaped ventilator 12 is adapted to fit.

Figure 3:
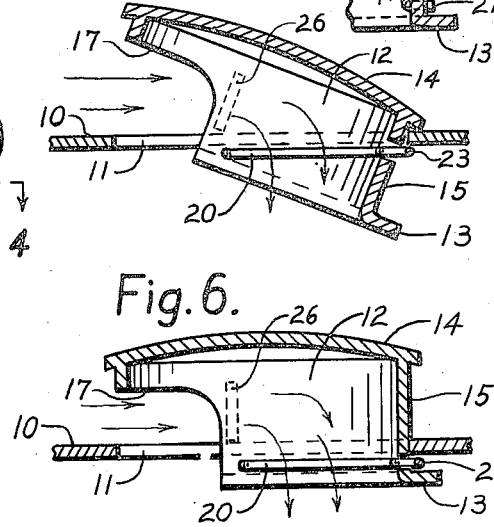
Figure 3 is a cross-section through the ventilator of Figure 1 taken along the line 3—3 of Figure 1.

This cup-shaped ventilator has an outwardly flared or rim portion 13 adapted to be disposed on the inside of the opening, and it has a cap portion 14 of slightly larger dimension than the opening 11, and it has a circular wall portion 15. This wall portion 15 has a cut away portion 17, which, when the cup-shaped member is swung outwardly at its front portion, as shown in Figure 3, serves as a scoop to scoop up the air through which the vehicle is passing such as an airplane while in flight, and force the air through the opening 11 into the interior of the vehicle.

Mounted on the interior of the cup-shaped member is a resilient member 20 made of any suitable material, such as spring steel, which has projections 21 and 22 on its ends adapted to project through suitable holes in the wall portion 15 to limit outward movement of the front portion of the cup-shaped member, as these projections 21 and 22 are adapted to engage the interior surface of the wall member 10. The member 20 exerts outward pressure on the sidewall of the ventilator in all forms of the invention and provides the frictional contact necessary to hold the ventilator in adjusted position.

Figure 5:
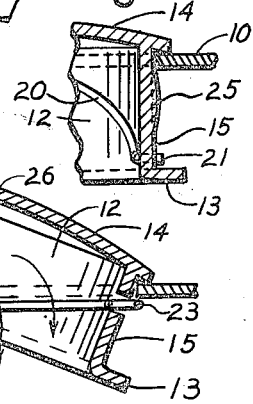
Figure 5 is a cross-section through the part of the ventilator of Figure 2 taken along the line 5—5 of Figure 2.
Figure 2:
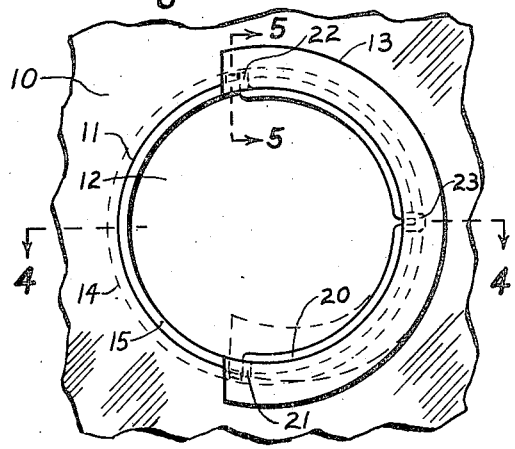
Figure 2 is an elevation of the ventilator shown in Figure 1, viewed from the inside of the vehicle, and showing the ventilator in a closed position.
Figure 6:
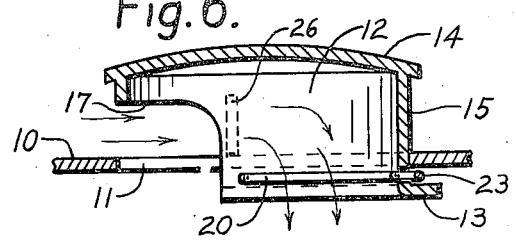
Figure 6 is a cross-section through the center of a modified ventilator which permits a variation in the opening and closing of the ventilator.
Figure 4:
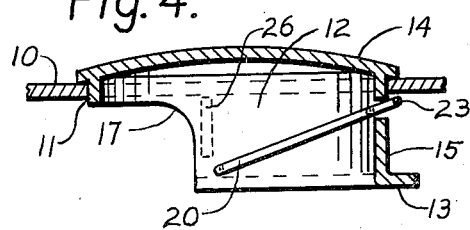
Figure 4 is a cross-section through the ventilator of Figure 2 taken along the line 4—4 of Figure 2.

The member 20 also has a hump or projection formed thereon designated by reference character 23 which projects through a suitable opening in the rear portion of the wall 15, and is adapted to limit outward movement of the ventilator as this portion 15 is adapted to rest against the interior surface of the member 10 at all times. In Figures 5 and 6, the member 20 has the portion 23 projecting through the wall portion at a different position or near the base of the rim 13. This permits the ventilator to be slid outwardly or inwardly bodily to open or close the ventilator and to expose its scooped portion to the air passing by the vehicle.

In Figure 5, I show a humped or raised projection 25 sloping in each direction towards the base portion 13 and the cap portion 14 so as to cause the ventilator to remain in adjusted position outwardly or inwardly as the case may be. While in Figure 6, this projection represented by 25 in Figure 5 is shown in dotted lines and is represented by reference character 26 as being at a different point on the wall portion 15, but serving the same purpose.

In Figures 9 and 10, the structure is similar to that shown in Figures 1 to 4 inclusive, except that in Figures 9 and 10, the top or exterior member 14 is shown not in the form of a circle, but in the form of an ellipse, so that its vertical dimension is less than its horizontal dimension, which permits the ventilator or cup-shaped member to be compressed, so that it can be removed from the opening from the inside of the vehicle.

In Figures 7 and 8, like parts indicate previously described parts, except that in Figures 7 and 8, there is no rim 13 on the interior of the vehicle, but the expander ring 20a serves as the sole means for holding the cup-shaped member within the opening 11 and prevents its removal from the opening except when the expander ring is compressed. This expander ring 20a is shown as being of flat material, but the function and operation remain the same as previously described.

Figure 12:
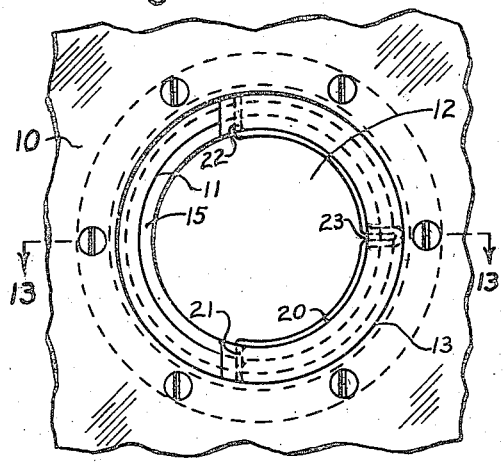
Figure 12 is an elevation from the inside of the vehicle of a modified ventilator which provides for its installation in a vehicle which is constructed with a double wall or lined with upholstery.
Figure 13:
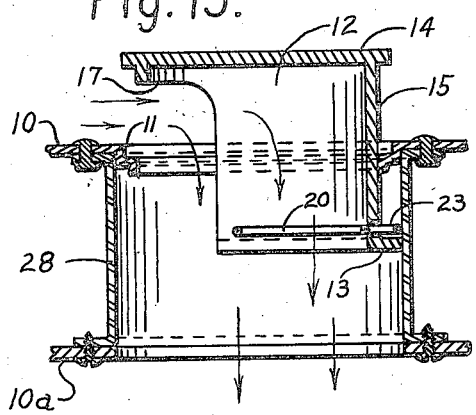
Figure 13 is a cross-section through the ventilator of Figure 12 taken along the line 13—13 in Figure 12.

In Figures 12 and 13, there is shown a modified form of the invention, in which like reference characters apply except that it is adapted to be placed within an aircraft or other vehicle having thicker walls than that indicated in the other drawings. In the structure shown in Figures 12 and 13, this is especially adaptable for a vehicle having a double wall, insulated wall, or an upholstered wall. Here a tubular spacer member 28 is provided between the outer wall 10 and the inner wall 10a, and in this tubular member 28, the ventilator is mounted. In this form of the invention, the expander ring 20 forces the flange 13 against the interior of the tubular member 28 and provides the required friction for holding the ventilator in desired adjustment. The projections of the expander ring 20 also contact the wall of the tubular member 28 and provide friction for holding the ventilator in the desired adjustment.

Figure 1:
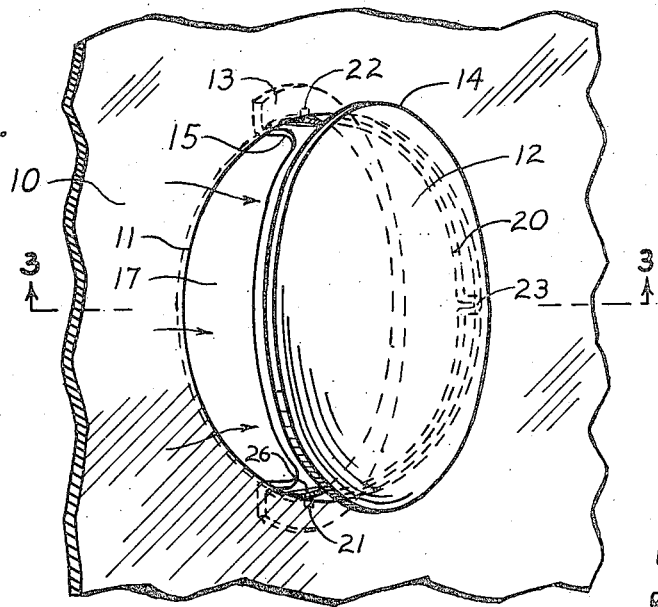
Figure 1 is a perspective view of my ventilator taken from the outside of the vehicle, and showing the ventilator in open position.

Due to the fact that the ventilator, as shown in Figure 1, is compressed to allow it to be inserted into the opening 11, there is a pressure exerted on the wall of the opening by the cup-shaped member 12, and this holds by reason of friction the ventilator in adjusted position. The same is true in all other figures of the drawings except in Figures 12 and 13 where the expander ring 20 furnishes the desired frictional engagement between the rim portion 13 and the tubular portion 28. The expanding thrust of the expander ring 20 forces the side walls of the cup-shaped member outwardly against the circular cut out in the wall of the vehicle, and the pressure of contact between the surface of the opening in the wall of the vehicle and the exterior of the cup-shaped element provides the friction necessary to retain the cup-shaped element in adjusted position, as the cup-shaped element can be rotated within the opening to regulate the amount of air which is forced through the opening 10 as in Figure 1, for example; the cup-shaped element is shown in an adjusted position to allow the maximum amount of air to be forced through the opening 10. It is evident that if the cup-shaped element is rotated in either direction, that less area of the opening 11 will be subject to the direct force of the air currents through which the vehicle is passing.

Figure 14:
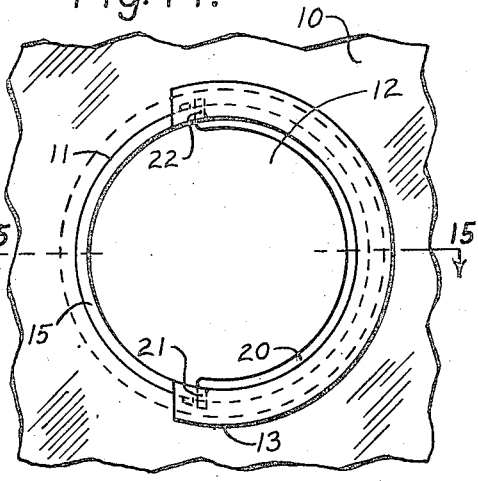
Figure 14 is an elevation from the inside of the vehicle of the type shown in Figures 1 to 6 with a modified expander ring.
Figure 15:
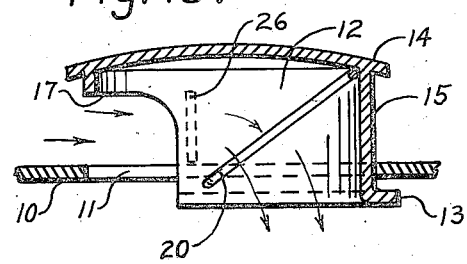
Figure 15 is a cross-section through the ventilator of Figure 14 taken along the line 15—15 in Figure 14.

In Figures 14 and 15, a slightly modified form of the invention is shown which is similar to the structure shown in all figures except Figures 12 and 13, and like reference characters will apply to like parts. The main difference is that the expander member 20b does not have any rear projection 23 thereon. This permits the ventilator to be slid outwardly or inwardly bodily instead of pivoting or very much in the same manner as the structure shown in Figures 7 and 8 operates, except that there is a rim portion 13 in Figures 14 and 15. In the forms shown in Figures 7, 8, 14, and 15, the rear edge of portion 14 can be resting against the exterior of wall 10 and the front portion of the ventilator can be swung outwardly.

It is thus seen that I have provided a ventilator having fewer parts than other types of retractable ventilators, one which is easier, quicker, and more economical to install and which is readily removable when general service requirements make it necessary to remove the ventilator. It is lighter in weight than other ventilators, and when a number of installations are made in a single airplane or vehicle, the accumulated saving in weight is important. The ventilator may be constructed of transparent plastic material which allows vision through the ventilator. This is an advantage especially when installations are made in transparent enclosures. The modified structure as shown in Figures 9 to 11 inclusive can be readily removed from the interior of the vehicle. When used in windows of military transport planes, this opening provided by the easy removal of the ventilator can be used for a gun port. In this manner, the ventilator serves as a gun port closure, as well as a ventilator.

The design with the modified expander ring shown in Figures 7 and 8, is constructed so that projections on the exterior of the expander ring serve to retain the ventilator in the vehicle wall if the usual flange is not desired.

In the drawings and specification, there has been set forth a preferred embodiment of the invention, and although specific terms are employed, they are used in a generic and descriptive sense only, and not for the purposes of limitation, the scope of the invention being defined in the claims.

I claim:

1. A ventilator adapted to be tensionally and rotatably held in a circular hole in an enclosing wall of a vehicle comprising a cylindrical portion of flexible material having an outside dimension which is slightly larger than the hole in the vehicle wall and having a cut-away portion extending from its inner end towards its outer end so that the inner end of the cylindrical portion can be compressed for insertion into the hole, a cap member closing the outer end of the cylindrical portion and having portions thereof extending outwardly beyond the outer surface of the cylindrical member, the cylindrical member having means projecting outwardly from its inner end for normally preventing the ventilator from moving entirely out of the hole, said cylindrical member having a projection intermediate its ends and on its exterior surface to prevent inward or outward movement of the ventilator relative to the enclosing wall except when the cylindrical member is compressed.

2. A ventilator adapted to be tensionally and rotatably held in a circular hole in an enclosing wall of a vehicle comprising a cylindrical portion of flexible material having an outside dimension which is slightly larger than the hole in the vehicle wall and having a cut-away portion extending from its inner end towards its outer end so that it can be compressed for insertion into the hole, a cap member closing the outer end of the cylindrical portion and having portions thereof extending outwardly beyond the outer surface of the cylindrical member, the cylindrical member having means projecting outwardly from its inner end for normally preventing the ventilator from moving entirely out of the hole, said cylindrical member having a projection intermediate its ends and on its exterior surface to prevent inward or outward movement of the ventilator relative to the enclosing wall except when the cylindrical member is compressed, the cap member being substantially elliptical in form so that along its minor axis its outer edges are substantially flush with the outer surface of the cylindrical member whereby when the cylindrical member is compressed the ventilator can be removed inwardly into the vehicle out of the hole in the enclosing wall.

3. A ventilator adapted to be tensionally and rotatably held in a circular hole in an enclosing wall of a vehicle comprising a cylindrical portion of flexible material having an outside dimension which is slightly larger than the hole in the vehicle wall and having a cut-away portion extending from its inner end towards its outer end so that it can be compressed for insertion into the hole, a cap member closing the outer end of the cylindrical portion and having portions thereof extending outwardly beyond the outer surface of the cylindrical member, the cylindrical member having means carried by and projecting outwardly from its inner end for normally preventing the ventilator from moving entirely out of the hole, said cylindrical member having a pair of opposed holes adjacent the cut-away portion and near the inner end of the cylindrical member and a resilient member disposed within the cylindrical member and having its ends projecting outwardly beyond the outer surface of the cylindrical member, said cylindrical member also having a hole in that portion which is opposed to the cut-away portion, and said resilient member also having a projection extend through the last-named hole.

4. A ventilator adapted to be positioned in a circular hole in the wall of a vehicle comprising a tubular member circular in cross-section and having the same diameter from its inner end which is disposed inside the vehicle to its outer end which is positioned outside the wall of the vehicle, said tubular member having a diameter which is slightly greater than the diameter of the hole to cause its exterior to frictionally engage the walls of said hole, said tubular member being slidable inwardly and outwardly in said hole, a cap closing the outer end of the tubular member, means projecting from the outer surface of the inner end of the tubular member for normally preventing the member from moving outwardly entirely out of the hole, less than half of the tubular member being cut away from its inner end to near its outer end so the inner end can be compressed for insertion of the inner end of the tubular member into the hole or removal of the same therefrom, and means projecting from the exterior surface of the tubular member and intermediate the ends thereof for holding the tubular member in adjusted position relative to said hole.

BURTON B. SIMCOX.

REFERENCES CITED

The following references are of record in the file of this patent:

UNITED STATES PATENTS

| Number | Name | Date |
|---|---|---|
| 646,096 | Muzzy | Mar. 27, 1900 |
| 1,170,436 | Erickson | Feb. 1, 1916 |
| 1,733,759 | Snell | Oct. 29, 1929 |
| 2,058,659 | Bellanca | Oct. 27, 1936 |
| 2,092,655 | Page, Jr. | Sept. 7, 1937 |
| 2,141,878 | Roby | Dec. 27, 1938 |
| 2,239,255 | Shaw | Apr. 22, 1941 |
| 2,248,329 | Bell, Jr. | July 8, 1941 |
| 2,286,584 | Simcox | June 16, 1942 |